US006601217B1

(12) United States Patent
Smith

(10) Patent No.: US 6,601,217 B1
(45) Date of Patent: Jul. 29, 2003

(54) SYSTEM AND METHOD FOR ERROR CORRECTION IN AN ELECTRONIC COMMUNICATION

(75) Inventor: Brian L. Smith, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/548,945

(22) Filed: Apr. 13, 2000

(51) Int. Cl.$^7$ .............................. G08C 25/02; H04L 1/08
(52) U.S. Cl. ......................................... 714/822; 714/748
(58) Field of Search .................................. 714/822, 712, 714/748, 751, 776, 800

(56) References Cited

U.S. PATENT DOCUMENTS

| | | | | | |
|---|---|---|---|---|---|
| 5,153,920 | A | * | 10/1992 | Danner | 370/398 |
| 5,710,798 | A | * | 1/1998 | Campana, Jr. | 375/347 |
| 6,170,075 | B1 | * | 1/2001 | Schuster et al. | 714/776 |
| 6,345,375 | B1 | * | 2/2002 | Kelkar et al. | 714/748 |
| 6,490,705 | B1 | * | 12/2002 | Boyce | 714/776 |
| 6,516,435 | B1 | * | 2/2003 | Tsunoda | 714/751 |

FOREIGN PATENT DOCUMENTS

JP    410093659 A  *  4/1998

* cited by examiner

Primary Examiner—Albert Decady
Assistant Examiner—Cynthia Britt
(74) Attorney, Agent, or Firm—Park, Vaughan & Fleming LLP

(57) ABSTRACT

A system and method are provided for performing error correction for all or part of an electronic communication, such as a routing header of a packet. At a transmitting entity the routing information contained in the header is divided into a plurality of segments. Multiple iterations of the routing segments are included in the packet, with the routing segments arranged in different sequences in different iterations. Thus, when transmitted across a communication link comprising multiple lines, each routing segment is carried across at least two different subsets of the lines, thus increasing the likelihood that at least one version of the segment will be received without error. Each segment of each iteration may be encoded with error detection information. For example, a parity bit may be added to each segment. At the receiving entity each iteration is received in turn, and each segment of the received iteration is checked for errors. When a segment is received without errors, it can be forwarded (e.g., for higher level processing) without waiting for the versions of the same segment to come in later iterations. Conversely, if an error is detected in a segment, a later version of the segment may be used. Thus, by the time the final iteration of routing segments is received, it may already be resolved or known whether they need to be examined. The error correction system is capable of detecting and correcting single bit errors, some instances of multiple bit errors, and broken lines as well.

26 Claims, 2 Drawing Sheets

SYSTEM AND METHOD FOR ERROR CORRECTION IN AN ELECTRONIC COMMUNICATION

BACKGROUND

This invention relates to the field of computer systems and communications. More particularly, a system and methods are presented for facilitating fast error correction for small communication packets and/or distinct portions of communication packets.

Communication packets exchanged between computer systems (e.g., through a network) usually include some form of error correction encoding in addition to whatever data, headers, trailers or other elements they may include. In particular, a packet may include an ECC (Error Correction Code), which may be calculated or computed using any of a variety of algorithms. The ECC or other error correction mechanism is generated by the entity (e.g., computer system) that sends the packet and is used by the packet recipient to determine whether the packet was received with any errors and to correct them, where possible. A Hamming code, for example, allows the recipient of a packet to correct a single bit error in an encoded packet or detect a multi-bit error.

Often the ECC is calculated for the entire contents of a packet, rather than just the data or other portion. In such a situation it becomes difficult to detect a single bit error on a line that is stuck or broken. For example, if one line of a communication link is stuck on, then every bit of the packet that traverses the line risks being transformed from a zero into a one. Decoding the ECC or applying error correction at the receiving entity may allow it to determine that a multi-bit error has occurred, but it may not be able to narrow that observation to determine that a line is broken or determine which line is broken.

The larger percentage of a packet that is covered by an ECC and the more types of errors to be protected from (e.g., single bit error, multiple bit errors, broken line), the more complicated the ECC algorithm may become. The more complex the error correction algorithm, the longer it takes for the recipient to decode the packet, detect any errors and, if possible, correct them. In particular, first the coded information must be received, then it must be decoded, or the ECC re-computed on what was received, in order to determine if there are any errors. If there is an error, it must then be corrected before the information can be acted on. Even if there is no error, however, the delay induced in order to check for errors may be non-trivial, thereby detracting from the performance of an application waiting for the packet.

Further, an end recipient or intermediate recipient of a packet (e.g., a router) may only need to access a small portion of the packet, such as a routing header. If this recipient is forced to decode the entire packet in order to access and/or verify the correctness of the routing information, the packet suffers what should be an unnecessary delay.

Thus, what is needed is a method of error correction for a small packet or a portion (e.g., routing header) of any size packet that decreases the time needed to check the packet or packet portion for errors and correct an error. It is also desirable to be able to retrieve or rebuild the packet or packet portion in the event of an error, even if one line of the communication or data link is broken. Further, by applying such a method of error correction to a specific portion of a packet, the packet may be processed faster by an entity requiring access only to that portion.

SUMMARY

In one embodiment of the invention a system and methods are provided for facilitating error correction of small packets or portions of any size packets. In this embodiment a packet or packet portion is divided into multiple segments and the packet or packet portion is repeated in such a way that the segments in each iteration are arranged in a different order. It may be sufficient to repeat the packet or packet portion twice, but additional repetition will allow correction of more errors at the receiving entity. Thus, if the error correction is to be applied to a routing header of a packet, the routing header is segmented and then multiple iterations of the header are included with the packet rather than a single copy. However, the segments of the routing header are arranged in different sequences among the multiple iterations and may therefore be transmitted over different elements of a communication link.

The entity that receives the packet or packet portion applies an error correction algorithm to each iteration of the packet or packet portion, each segment, the overall collection of multiple iterations, etc. This algorithm may differ from any error correction algorithm applied to another portion of the packet.

In this embodiment each segment of the packet or packet portion is received multiple times (e.g., twice), over different lines of the incoming communication link. As the packet or packet portion is received, each segment or iteration of the packet or packet portion can be checked for errors while a succeeding segment or iteration is being received. If an error is detected in one segment of one iteration, the segment can be retrieved from a different iteration. And, by comparing errors among the multiple iterations a broken line can be detected (e.g., a single bit error may be detected in each segment that uses the broken line).

By the time the final iteration of the packet or packet portion is received, the receiving entity, may have already determined whether a previous iteration or segment was received correctly. Thus, if an initial or early iteration is received without any detected errors, before the final iteration is received the receiving entity may begin passing the packet or packet portion forward for higher level processing, for use by a router, etc. If all preceding iterations have errors, then the final iteration may be passed forward immediately upon receipt.

In one particular embodiment of the invention multiple segments of routing data or other information are received in multiple iterations or versions, with the segments arranged in different sequences in each iteration. When a first iteration is received, each segment is checked for errors, possibly using a parity indicator (e.g., a parity bit or other error detection code) computed and set by the entity that sent the data. If an error is detected in a given segment of the first iteration, that segment may be retrieved instead from a different iteration. Because the segments are sent in different sequences in the different iterations, it is likely that at least one version will be received without errors.

DETAILED DESCRIPTION

Figure 1:
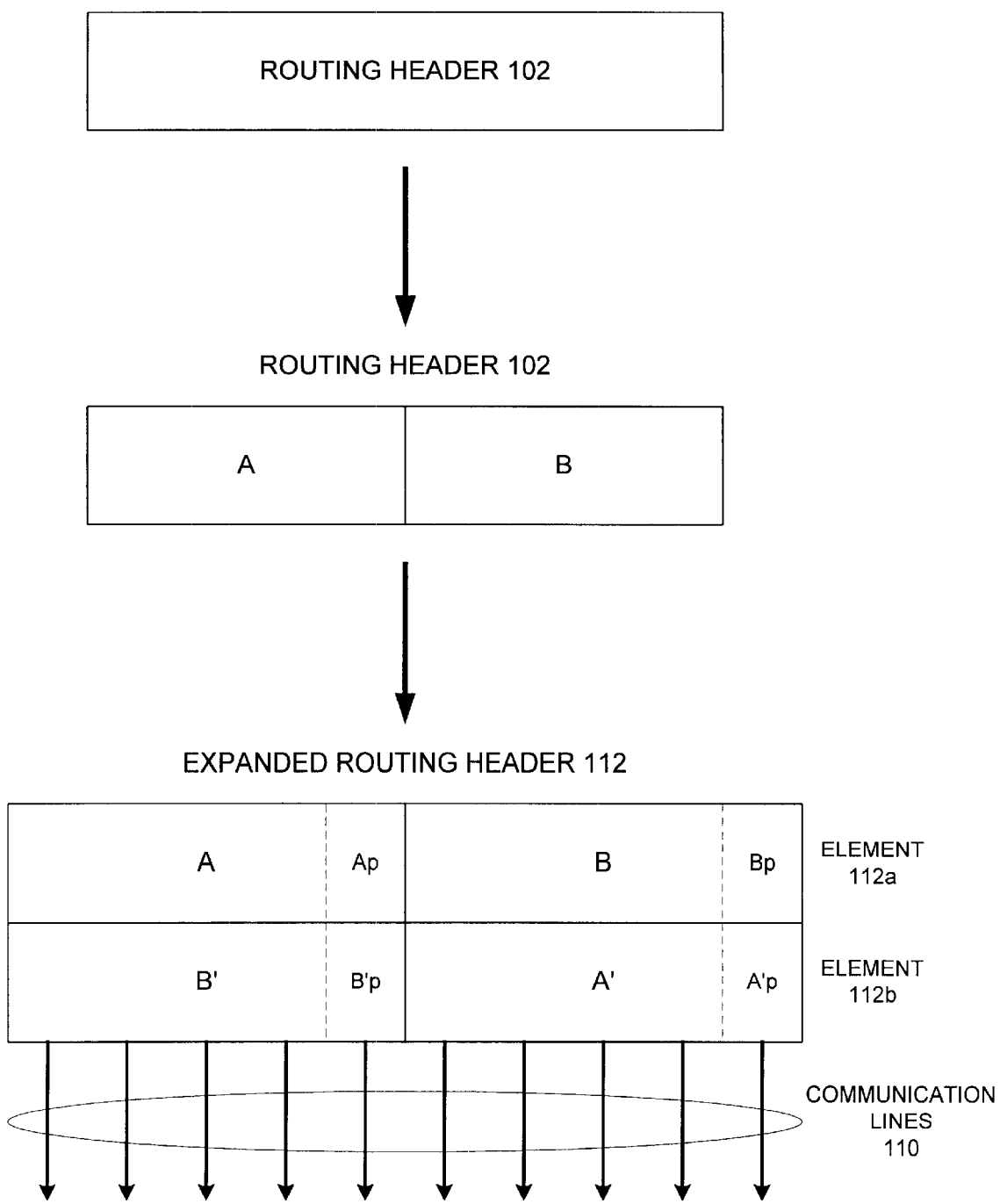
FIG. 1 is a block diagram of a packet portion that is segmented to facilitate error correction in accordance with an embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) are omitted for the sake of clarity.

It should also be understood that the techniques of various embodiments of the invention discussed below might be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

A system and method are provided for facilitating error correction on small packets or distinct portions of packets of any size. The systems and methods discussed herein are described as they may be applied to a routing header or other identifiable portion of a packet (e.g., header, trailer, data) communicated over an electronic communication link. It will be understood, however, that the embodiments and implementations that are described below may be adapted for use with entire packets and other electronically communicated information that may benefit from a rapid error correction technique, whether or not in packet form.

In one embodiment of the invention a routing header is generated for a packet to be sent from an originating entity (e.g., computer system) to a destination entity. In accordance with this embodiment, however, the header is modified in order to enable rapid error detection at the destination and, possibly, error correction as well. In particular, the routing header is divided into two or more segments and an error correction or detection algorithm is applied to each segment so that the destination entity may determine the validity or correctness of each segment. For example, in this embodiment a parity bit may be added to each segment by XORing the elements (e.g., bits) of the associated header segment. In place of the single original routing header multiple iterations or copies of the routing information are added to the packet. Illustratively, the number of iterations of the routing information is less than or equal to the number of segments. Advantageously, however, the segments of the original routing header are placed in a different order in the different iterations. In particular, in one embodiment the order or sequence of the segments in each iteration is different from the segment sequences in every other iteration.

Two iterations of the routing information may be sufficient to detect and correct all single bit errors in a present embodiment of the invention. In one alternative embodiment, however, more than two iterations may be issued in order to correct additional errors.

Illustratively, the size of (e.g., number of bits in) a segment may depend upon the size of the original routing header, the width of the bus or communication link between the two entities or the processing speed of the destination entity (e.g., which affects how fast each segment can be checked for errors). For example, if the bus width is ten bits and the original header is eight bits, then the header may be divided into two segments of four bits. For error detection purposes, a parity bit may be added to each segment, in which case each iteration requires ten bits, thereby employing the full width of the bus and allowing each iteration to be sent in one data beat (e.g., one transfer of data).

Two iterations of the routing information may then be attached to the packet, with the segments (and their parity bits) in different (e.g., reverse) order in each one. As discussed below, one advantage of this embodiment of the invention is the rapid detection of errors by the destination entity. The rate at which the header segments in each routing iteration are checked for errors by the destination entity depends in part on the size of the segments. Thus, the size of the segments may be adjusted, if necessary, to maintain the ability to process each segment at a pace that is fast enough to check each segment of one iteration before the next full iteration is received.

It can be seen that in this embodiment of the invention the size of the routing segments and the overhead added by the error correction applied to the segments are coordinated with the width of the communication link so that during each data beat one iteration may be transmitted. In a clock domain that uses both edges of the clock signal, two data beats (i.e., two data transfers) occur during each clock cycle and two routing iterations are transmitted. In contrast, in a clock domain that uses only one edge of the clock signal, only one data beat (i.e., one data transfer) occurs per cycle. Thus, the data rate of the first domain is twice that of the second domain (assuming that the width of the communication link remains the same). Embodiments of the invention described herein may be applied within either type of clock domain and may be applied across or between such domains. Further, an embodiment of the invention may be used in virtually any situation in which information is transferred from a first clock domain to a second and the first clock domain operates at a faster rate than the second.

FIG. 1 illustrates the division of a routing header into multiple segments to facilitate rapid error correction in one embodiment of the invention. Routing header 102 of FIG. 1 may be generated by a device driver or other component of an originating communication entity configured to generate or attach routing information for or to an outbound packet or communication. Thus, the information within routing header 102 may be intended for or may be usable by a destination computer system or an intermediate entity (e.g., router) before a destination entity.

In existing methods of error correction a routing header may be added to an outgoing packet, and an appropriate algorithm may be applied to any or all of the routing header, the rest of the packet, the entire packet including the routing header, etc. In these situations, however, when the packet is received the receiving entity must wait until the entire packet or header is read before it can check either for errors. And, there is the delay not only of checking for errors but of correcting them as well, before the packet can be further processed (e.g., to retrieve its data or forward it to another entity). Thus, if the receiving entity is a router, it may need to receive the entire packet and decode it before it can retrieve and use the routing information. Even if the routing header is separately encoded for error detection/correction, the entire header must be received, decoded and checked for errors before the information can be used—thus delaying delivery of the packet. Further, it becomes difficult, if not impossible, to detect and correct a broken line in a packet if one error correction algorithm is applied to the entire packet. The embodiment of the invention illustrated in FIG. 1 is configured to allow faster error detection than is possible with the existing method just described. In addition, the illustrated embodiment allows a broken line error to be detected and corrected.

In FIG. 1, according to one embodiment of the invention, routing header 102 is eight bits wide and may be logically divided into two segments, denoted A and B, each of which is four bits wide. In alternative embodiments a packet or packet portion may be of virtually any size and may be divided into any number of segments. The number and size of segments may be affected by the size of the routing header, the width of the data bus or communication link (e.g., number of lines in the bus or link), the error correction or detection algorithm applied to the segments, etc.

As discussed below, in order to decrease the amount of time needed to perform error detection on a packet or packet portion when it is received, it may be beneficial to use smaller segments. For example, to fill each data beat in a communication link having twelve lines, an embodiment of the invention may include just two segments in each iteration, wherein each segment includes five bits of routing information and one parity bit. In another embodiment, three segments may be included—with each segment including three bits of routing information and one parity bit. The former embodiment generates less overhead (e.g., fewer parity bits), but the segments may be too large for the destination entity to process in a timely manner. Conversely, with a larger number of segments, the error detection code (e.g., parity bits) uses more of the data beat, thus decreasing the amount of data or other payload that can be transmitted. However, the destination entity may be able to process the smaller segments faster than larger segments.

In alternative embodiments of the invention in which error detection mechanisms other than parity bits are employed, even more overhead may be required. Thus, between the width of a communication link, the processing speed of a destination entity, the error detection code that is use and other factors, some flexibility may be applied in determining a workable or optimal segment size.

Returning now to the embodiment of the invention depicted in FIG. 1, instead of adding original routing header 102 to the outgoing packet, expanded routing header 112 is used in its place. In FIG. 1 expanded routing header 112 comprises two elements, each of which contains all of the routing information of header 102—comprising segments A and B—but in different sequences. Each element thus corresponds to one data beat in the illustrated embodiment. Element 112a includes the routing segments in the order (A, B), while element 112b orders the segments as (B, A). In FIG. 1, the segments of element 112b are denoted as A' and B' to indicate that, while identical to A and B in terms of the information they carry (i.e., A=A' and B=B') when generated and placed in routing header 112, they are transmitted in different elements or iterations of the routing information.

Expanded routing header 112 is transmitted over a communication link represented by communication lines 110. The communication link couples the entity that transmits the packet containing the expanded routing header to a destination entity that receives and processes the expanded header (e.g., a destination computer system, a router interposed between origination and destination computer systems). It can be seen in FIG. 1 that in the different elements of the expanded routing header each segment of routing information is passed over a different set of lines.

Ap and Bp represent the parity bits associated with segments A and B of element 112a. Similarly, A'p and B'p are the parity bits associated with segments A' and B' of element 112b. Illustratively, the parity bits are added to expanded routing header 112 when the header is prepared for the outgoing packet. In one embodiment the parity bits may be computing by XORing each bit of the associated segment. As described above, in alternative embodiments of the invention error detection codes or indicators other than parity bits may be used.

In the illustrated embodiment of the invention each element of expanded routing header 112 can be sent in a single data beat. Thus, at the destination entity element 112a is received during a first beat and element 112b is received during a second beat. Advantageously, element 112a may be processed (e.g., checked for errors) while element 112b is being received.

In particular, after element 112a is received and read, and while element 112b is being read, the destination entity checks segments A and B of element 112a for errors. In this illustrated embodiment this entails re-computing Ap and Bp by XORing A and B, respectively. If the re-computed Ap and Bp match the Ap and Bp of element 112a, the receiving entity may assume that segments A and B were received without error.

If they are deemed error-free, then A and B can be immediately passed on for higher-level processing (e.g., to determine how/where to route the packet), possibly without even waiting for element 112b to be received and checked for errors. Thus, if the entity is a router, the router can apply the routing information and begin forwarding the packet as soon as element 112a has been received and checked for errors.

In one embodiment of the invention, however, element 112b is checked for errors before forwarding the packet or otherwise using the information represented by segments A and B. Therefore, B'p and A'p are re-computed on B' and A', respectively, and compared to the B'p and A'p received in element 112b. If no errors are indicated, then the receiving entity can proceed normally.

If an error was detected in segment A or segment B of element 112a, the receiving entity may discard one or both of them and automatically apply or process the segments of element 112b (e.g., by assuming they are correct). Thus, in the case of an error with a segment of element 112a, the matching segment of element 112b may be assumed to be free of errors and immediately forwarded for higher-level processing. However, in the interest of data integrity segments A' and B' of element 112b may be checked for errors even if segments A and B are deemed invalid.

Thus, in one embodiment of the invention each segment of each element is checked for errors by re-computing the parity bits. If a single bit error is detected in a segment of one element (e.g., segment B of element 112a), then the corresponding segment in another element (e.g., segment B' of element 112b) may be used for routing by the receiving entity. A broken line may be detected and identified if corresponding segments received over the same lines in different iterations (e.g., segments A and B') have single bit errors and, when the segments are compared to their counterparts (e.g., segments A' and B) it is determined that a single bit error occurred in the same location. Advantageously, in the case of a single broken line the destination entity is able to continue processing by using the segments that did not pass over the broken line. Even multiple bit errors are detectable and may be correctable (e.g., if an odd number occur in one segment) in the illustrated embodiment of the invention. In an alternative embodiment in which a different error correction code is used, additional multiple bit errors may be correctable.

In the case of a multi-bit error that cannot be corrected, the system may be halted. In the illustrated embodiment two situations may constitute unrecoverable errors that require intervention or system restart. In one situation the re-computed parity bits for corresponding segments of each element, such as segments A and A', match their parity bits, Ap and A'p, but segments A and A' do not match each other. In the other situation deemed to constitute an unrecoverable error, corresponding parity values retrieved from each element, such as Ap and A'p, differ from the parity values re-computed for their associated segments.

Figure 2:
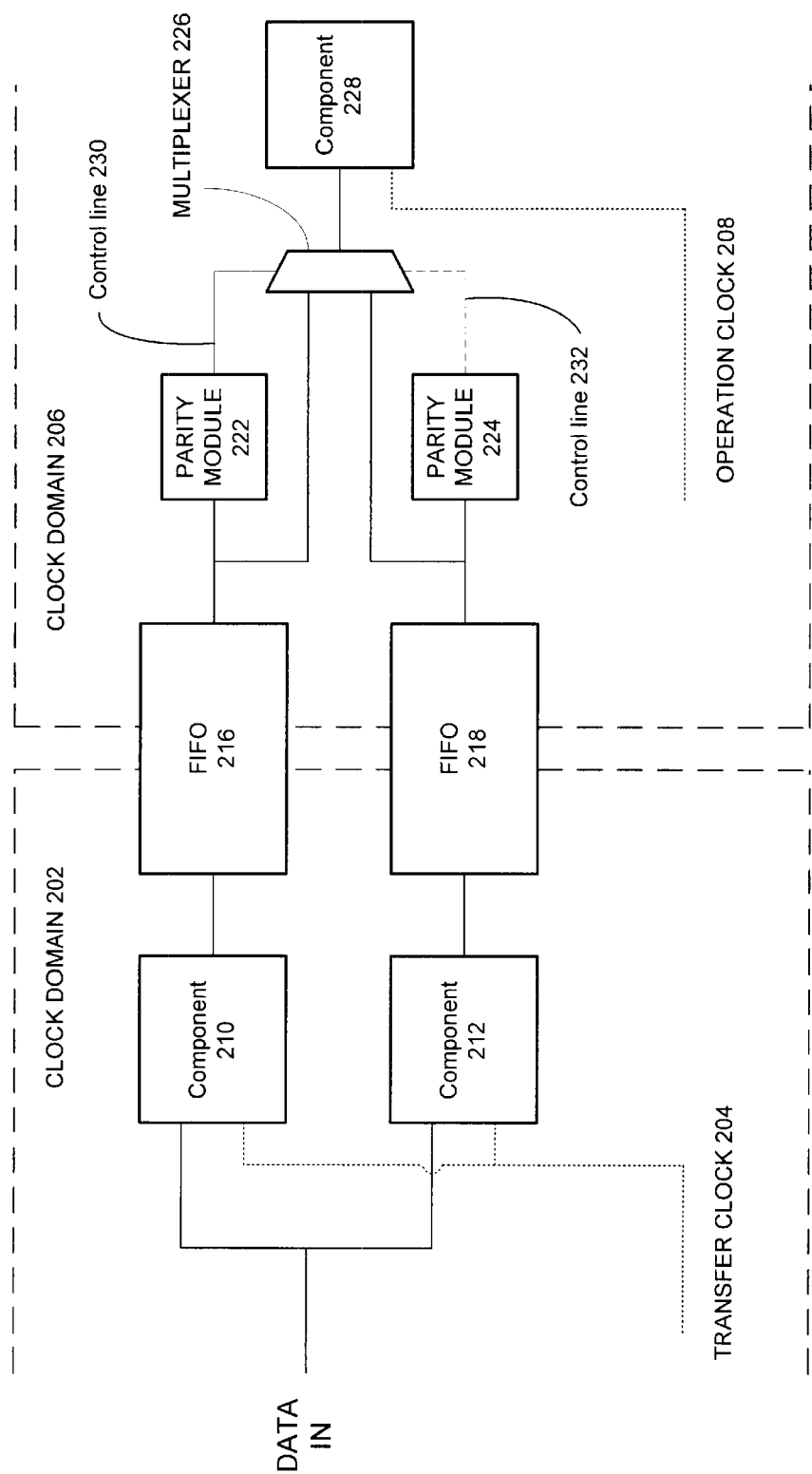
FIG. 2 is a block diagram of a circuit for transferring data between clock domains while checking it for errors in accordance with an embodiment of the present invention.

FIG. 2 illustrates an error correction system according to one embodiment of the invention. In particular, FIG. 2 depicts a circuit for performing error correction as described above while transferring data or other information (e.g., the routing information of routing header 102 of FIG. 1) from one clock domain to another, where the data rate or clock signal of the first domain is different from that of the second domain.

In FIG. 2, a data transfer portion of the circuit is in clock domain 202 and 110 operates according to transfer clock 204. A data operation portion of the circuit is in clock domain 206 and functions under the timing of operation clock 208. In the illustrated circuit transfer clock 204 operates at twice the frequency of operation clock 208. Alternative embodiments of the invention may be implemented in systems in which transfer clock 204 operates faster than, but not necessarily twice as fast as, operation clock 208. Yet other alternative embodiments may be implemented in systems in which transfer clock 204 operates at the same or a lower frequency than operation clock 208. As will be understood from the following discussion, various of these embodiments mask error detection/correction where data is received into one clock domain from a faster domain, which is often the case when information is received at a discrete device (e.g., a chip in which only one edge of a clock signal is used).

Illustratively, in the embodiment of FIG. 2 data is processed in clock domain 202 on both edges (positive and negative) of the transfer clock signal. Thus, data is transferred into FIFO (First-In, First-Out) queues 216, 218 through components 210, 212 of the circuit. One of components 210, 212 therefore handles data received during the negative edge of the transfer clock signal, while the other component handles data received during the positive edge.

Because operation clock 208 operates at half the rate of transfer clock 204, when data is read into clock domain 206 it is read from both of FIFO 216 and FIFO 218 to keep up with the data transfer from domain 202. Thus, during each data beat in clock domain 202, one entry is placed in either FIFO 216 or FIFO 218. Then, during each data beat in clock domain 206, entries are read from both of the FIFO queues.

Entries placed in the FIFO queues may, for example, be iterations or elements of expanded routing header 112 of FIG. 1. Thus, in one data beat in clock domain 206 element 112a and element 112b of FIG. 1 could be read. In other embodiments of the invention, different numbers of FIFO queues may be employed. For example, where a routing header is divided into three segments and three header elements are used in place of the original header, with each element having three segments, transfer clock 204 may operate at three times the rate of operation clock 208 and three FIFO queues may be employed so that all three elements are handled at once in clock domain 206. The configuration of the error correction system of FIG. 2 may also be modified for an embodiment of the invention in which an error detection code other than parity is employed.

When an entry is retrieved into clock domain 206 from FIFO 216, it is passed to multiplexer 226 and parity module 222. Likewise, when an entry is retrieved from FIFO 218, it is passed to multiplexer 226 and parity module 224. The parity modules perform error detection on the entries and one or both of them feed an appropriate signal to the multiplexer to indicate whether the contents of the entry are free of errors. At multiplexer 226 the determination of which entry (e.g., the one from FIFO 216 or FIFO 218) to pass on to component 228 for further processing may depend on whether one of the parity modules reported an error.

In FIG. 2, control line 230 is used to inform multiplexer 226 whether to use the entry received from FIFO 216 or FIFO 218. In particular, parity module 222 checks its entry for errors and, if it free of errors multiplexer 226 is instructed to pass the entry from FIFO 216. If, however, parity module 222 detects an error, it instructs multiplexer 226 to pass the entry from FIFO 218. Thus, in one embodiment of the invention control line is unnecessary.

From the system depicted in FIG. 2 it can be seen that a multiplexer may be employed in an embodiment of the invention in order to determine which of multiple iterations of a packet or packet portion should be accepted for higher level processing. And, by the time the final iteration of the packet or packet portion arrives at the multiplexer it may already be resolved (based on the parity checks of a previous iteration), thus eliminating any delay in further processing of the packet or packet portion.

In one embodiment of the invention, multiple multiplexers may be employed and corresponding segments from different iterations or elements of a packet or packet portion may be fed to the same multiplexer. For example, with expanded routing header 112 of FIG. 1, segments A and A' may be fed to one multiplexer while segments B and B' are fed to another. Each multiplexer also receives a signal indicating the results of the parity check performed on the segment that was first received. Thus, the first multiplexer receives a signal from the parity check of segment A, while the second multiplexer receives a signal from the parity check of segment B. At each multiplexer, then, the decision of which segment to pass may be fully resolved by the time element 112b is received. If, for example, the parity check of segment A failed, the first multiplexer may be set to forward segment A'. If the parity check of segment B passed, then the second multiplexer may forward segment B (and segment B' need not even be checked or may be checked for uncorrectable errors).

The unique manner in which information (e.g., routing header 102 of FIG. 1) is segmented and repeated over different lines of a communication link in a present embodiment of the invention facilitates other packet operations. For example, a routing header may be associated with a data packet and the combination may be processed by a multi-processor routing device that employs bit-slicing. In this situation, it is necessary to ensure that each processor receives enough information to perform its routing even though it gets only a portion of the data. Segmenting and repeating the routing header as described above is one method of accomplishing this goal.

For example, in the embodiment of the invention described in conjunction with FIG. 1, one half of each data beat (e.g., segment A and Ap of element 112a) may be handled by one processor, while the other half (e.g., segment B and Bp) is handled by another. The first processor also receives segment B' and B'p of element 112b and the second processor receives segment A' and A'p. Further, each processor receives one half of the data following the expanded header. Thus, each processor receives a full set of the routing information and can take appropriate action (e.g., to forward or route its portion of the packet).

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of error checking an electronic communication comprising multiple information segments arranged in a plurality of sequences, the method comprising:
   receiving at a second entity a first sequence of multiple information segments transmitted by a first entity;
   receiving at the second entity a second sequence of said multiple information segments transmitted by the first entity, wherein said second sequence is different than said first sequence;
   error checking a first segment of said first sequence;
   error checking a second segment of said first sequence;
   forwarding said second segment of said first sequence if said second segment of said first sequence is free of errors; and
   forwarding a first segment of said second sequence if an error is detected in said second segment of said first sequence.

2. The method of claim 1, further comprising:
   error checking said first segment of said second sequence; and
   error checking a second segment of said second sequence, wherein said first segment of said first sequence was transmitted by said first entity with the same content as said second segment of said second sequence.

3. The method of claim 1, wherein said forwarding said second segment of said first sequence commences before said receipt of said second sequence is completed.

4. The method of claim 1, wherein the electronic communication is a packet and each said sequence of said multiple information segments comprises information usable for routing said packet.

5. The method of claim 1, wherein said first sequence comprises an original parity indicator transmitted by the first entity, received by the second entity and associated with said second segment of said first sequence,
   wherein said error checking said second segment of said first sequence comprises:
      computing a new parity indicator for said second segment of said first sequence; and
      comparing said new parity indicator to said original parity indicator.

6. The method of claim 5, wherein said error checking said second segment of said first sequence further comprises:
   computing a parity indicator for said first segment of said second sequence; and
   comparing said computed parity indicator for said first segment of said second sequence to an original parity indicator within said second sequence that is associated with said first segment of said second sequence.

7. The method of claim 6, further comprising determining whether a multi-bit error has occurred by:
   determining whether each of said computed parity indicators are different from said original parity indicators; and
   if said computed parity indicators match said original parity indicators, comparing said second segment of said first sequence to said first segment of said second sequence.

8. The method of claim 1, wherein the electronic communication is received across a communication link comprising multiple lines, and within said first sequence and said second sequence of said multiple information segments each said segment is received across a different subset of said lines.

9. The method of claim 8, further comprising determining that one of said multiple lines is broken.

10. The method of claim 9, wherein said determining comprises:
    detecting a first single bit error in said first segment of said first sequence;
    detecting a second single bit error in a first segment of said second sequence;
    comparing said first segment of said first sequence with a second segment of said second sequence; and
    comparing said first segment of said second sequence with said second segment of said first sequence;
    wherein said first segment of said first sequence and said first segment of said second sequence are received across a first subset of said multiple lines of the communication link.

11. A computer-implemented method of error checking an electronic communication transmitted from a first communication device to a second communication device, wherein the communication includes a plurality of elements, one element comprising a plurality of information segments in a different order than another element, the method comprising:
    receiving a communication from a first device at a second device, wherein said communication comprises:
       a first element including a plurality of information segments in a first order; and
       a second element including said plurality of information segments in a second order;
    reading said first element of said communication;
    error checking said first element;
    reading said second element of said communication;
    error checking said second element; and
    forwarding said plurality of information segments.

12. The method of claim 11, wherein said first element further includes an error detection code associated with each of said plurality of information segments.

13. The method of claim 12, wherein each said error detection code is a parity indicator computed on said associated information segment.

14. The method of claim 12, wherein said error checking comprises re-computing said error detection codes for said associated information segments.

15. The method of claim 11, wherein said forwarding comprises:
   if said error checking indicates an error in said first element, forwarding said second element; and
   if said error checking indicates said first element is free of errors, forwarding said first element.

16. The method of claim 11, wherein said communication is received across a communication link coupling the first device to the second device, wherein the link comprises multiple lines and wherein said receiving comprises:
   receiving a first information segment over a first subset of said multiple lines in said first element; and
   receiving said first information segment over a second subset of said multiple lines in said second element;
   wherein an intersection of said first subset and said second subset is an empty set.

17. The method of claim 11, wherein said communication is received across a communication link coupling the first device to the second device, the communication link comprising multiple lines, and wherein said receiving comprises:
   receiving each of said plurality of information segments over a different subset of said multiple lines in said first element than in said second element.

18. The method of claim 11, further comprising determining whether an unrecoverable error has occurred by:
   computing a first error detection code for a first information segment in said first element;
   computing a second error detection code for said first information segment in said second element;
   determining whether said first computed error detection code matches a first original error detection code associated with said first information segment in said first element;
   determining whether said second computed error detection code matches a second original error detection code associated with said first information segment in said second element; and
   if said first computed error detection code matches said first original error detection code and said second computed error detection code matches said second original error detection code, comparing said first information segment of said first element to said first information segment of said second element.

19. The method of claim 18, wherein an unrecoverable error is detected if:
   said first computed error detection code is different than said first original error detection code and said second computed error detection code is different than said second original error detection code; or
   said first computed error detection code matches said first original error detection code and said second computed error detection code matches said second original error detection code and said first information segment in said first element is different than said first information segment in said second element.

20. A method of error checking routing information included in a packet, wherein the routing information comprises multiple segments arranged for transmission in different orders in a plurality of iterations, the method comprising:
   receiving a packet at a second network entity from a first network entity over a communication link comprising multiple lines, the packet comprising:
      a first iteration of routing information segments arranged in a first sequence;
      a first set of error detection indicators associated with said first iteration of said routing segments;
      a second iteration of said routing segments arranged in a second sequence; and
      a second set of error detection indicators associated with said second iteration of said routing segments;
   error checking said first iteration of said routing segments; and
   based on said error checking of said first iteration, determining whether to route the packet using said first iteration of said routing segments;
   wherein a first routing segment is received over a first subset of said lines in said first iteration and a different subset of lines in said second iteration.

21. A computer readable storage medium storing instructions that, when executed by a computer, cause the computer to perform a method of error checking an electronic communication comprising multiple information segments arranged in a plurality of sequences, the method comprising:
   receiving a first sequence of multiple information segments;
   receiving a second sequence of said multiple information segments, wherein said second sequence is different than said first sequence;
   error checking a first segment of said first sequence;
   error checking a second segment of said first sequence;
   forwarding said second segment of said first sequence if said second segment of said first sequence is free of errors; and
   forwarding a first segment of said second sequence if an error is detected in said second segment of said first sequence.

22. A computer readable storage medium containing a data structure configured to communicate a set of data divided into multiple subsets, wherein the multiple subsets are repeated in different sequences in multiple iterations of the set of data, the data structure comprising:
   a first iteration of a set of data divided into multiple subsets in a first sequence;
   a second iteration of said multiple subsets in a second sequence;
   a first error detection code associated with said first iteration; and
   a second error detection code associated with said second iteration;
   wherein if said data structure is communicated across a communication link having multiple lines, each of said multiple subsets are communicated across a different subset in said first iteration than said second iteration.

23. An apparatus for error checking an electronic communication comprising a plurality of information segments, wherein the plurality of segments are arranged in different sequences in each of multiple iterations of the information segments, the apparatus comprising:
   a first error detection module configured to check a first information segment from a first iteration, of multiple information segments for errors;
   a second error detection module configured to check a second information segment from said first iteration for errors; and a first multiplexer configured to receive a signal generated by said first error detection module and pass one of:
   said first information segment from said first iteration; and
   said first information segment from a second iteration of said multiple information segments, wherein said first information segment is located in a different position in said first iteration than in said second iteration.

24. The apparatus of claim 23, further comprising:
a second multiplexer configured to receive a signal generated by said second error detection module and pass one of:
   said second information segment from said first iteration; and
   said second information segment from said second iteration, wherein said second information segment is located in a different position in said first iteration than in said second iteration.

25. A computer readable storage medium storing instructions that, when executed by a computer, cause the computer to perform a method of error checking an electronic communication transmitted from a first communication device to a second communication device, wherein the communication includes a plurality of elements, one element comprising a plurality of information segments in a different order than another element, the method comprising:
   receiving a communication from a first device at a second device, wherein said communication comprises:
      a first element including a plurality of information segments in a first order; and
      a second element including said plurality of information segments in a second order;
   reading said first element of said communication;
   error checking said first element;
   reading said second element of said communication;
   error checking said second element; and
   forwarding said plurality of information segments.

26. A computer readable storage medium storing instructions that, when executed by a computer, cause the computer to perform a method of error checking routing information included in a packet, wherein the routing information comprises multiple segments arranged for transmission in different orders in a plurality of iterations, the method comprising:
   receiving a packet at a second network entity from a first network entity over a communication link comprising multiple lines, the packet comprising:
      a first iteration of routing information segments arranged in a first sequence;
      a first set of error detection indicators associated with said first iteration of said routing segments;
      a second iteration of said routing segments arranged in a second sequence;
      a second set of error detection indicators associated with said second iteration of said routing segments;
   error checking said first iteration of said routing segments; and
   based on said error checking of said first iteration, determining whether to route the packet using said first iteration of said routing segments;
   wherein a first routing segment is received over a first subset of said lines in said first iteration and a different subset of lines in said second iteration.

* * * * *